United States Patent [19]

Grandlic et al.

[11] 3,954,274

[45] May 4, 1976

[54] CLAY TILE PIPE JOINT SEAL CONTAINING FOAMED UNSATURATED POLYESTER RESIN

[75] Inventors: Eugene J. Grandlic, Sheboygan; Stanley N. Korb, Port Washington, both of Wis.

[73] Assignee: Freeman Chemical Corporation, Port Washington, Wis.

[22] Filed: Oct. 21, 1974

[21] Appl. No.: 516,821

[52] U.S. Cl.................................. 277/1; 260/2.5 N; 277/207 R; 285/291; 277/DIG. 6; 264/46.6
[51] Int. Cl.².................... C08G 63/02; C08J 9/10
[58] Field of Search.............. 260/2.5 N; 285/291; 277/207 B, 1; 264/46.6

[56] References Cited
UNITED STATES PATENTS

| | | | |
|---|---|---|---|
| 2,219,289 | 10/1940 | Bennett | 285/291 |
| 2,498,621 | 2/1950 | Kropa et al. | 260/2.5 N |
| 2,889,582 | 6/1959 | Cooper | 285/291 |
| 3,135,519 | 6/1964 | Ligon et al. | 285/291 |
| 3,251,603 | 5/1966 | Cobbledick et al. | 285/291 |

*Primary Examiner*—Harry Wong, Jr.
*Assistant Examiner*—Frank R. Cervi
*Attorney, Agent, or Firm*—Harry B. Keck; George E. Manias

[57] ABSTRACT

An improved joint seal for a clay tile pipe having bell and spigot configurations is provided with unsaturated polyester resin in a foamed, low density state, preferably below about 50 pounds per cubic foot.

7 Claims, 2 Drawing Figures

CLAY TILE PIPE JOINT SEAL CONTAINING FOAMED UNSATURATED POLYESTER RESIN

BACKGROUND OF THE INVENTION

1. Field of the Invention

Clay tile pipe joint seals fabricated from organic resins.

2. Description of the Prior Art

Clay tile pipes customarily are formed in a bell and spigot configuration. As a consequence of the high temperature firing to which clay tile pipes are exposed during fabrication, they are customarily non-uniform with respect to the outer diameter of the spigot end and the inner diameter of the bell end of each pipe unit. Concentricity is difficult to maintain. The clay tile pipe industry has accepted non-uniform cross-sectional profiles of the bell and spigot ends of the clay tile pipe and has developed joint seals which are resilient and which accommodate the irregularities. The very early prior art employed materials which were stuffed into the bell after the bell and spigot had been carefully aligned in position for ultimate use. Such stuffing materials included hemp, oakum, and other fibrous materials and other tacky materials such as asphalt. The stuffing was accomplished by tamping with suitable manual tools. Subsequently the clay tile pipe industry developed factory applied joint seals for the bell interior and for the spigot exterior which can be engaged to accommodate the spigot end of one clay tile pipe with the bell end of an engaged clay tile pipe.

Increased cost of unsaturated polyester resin materials for use in joint seals of clay tile pipes has caused the industry to re-evaluate earlier pipe joint sealing techniques in attempts to minimize overall installation costs. There is a clear-cut need for an improved clay tile pipe joint seal which will be as effective as the existing standard in the industry, that is, the unsaturated polyester resin joint seal, and yet which can offer significant cost savings over the existing unsaturated polyester resin construction.

SUMMARY OF THE INVENTION

According to the present invention a clay tile pipe joint seal has been developed which utilizes unsaturated polyester resins which are foamed by means of an acid activated, alpha-hydroxy azo blowing agent. See Canada Pat. No. 924,299. Conventional blowing agents are usually activated by heat and/or other additives. The acid activated alpha-hydroxy azo blowing agents do not require exposure to heat in order to induce blowing. The density of the resulting foamed unsaturated polyester resin is significantly less than the density of the unsaturated polyester resins which have been utilized in the prior art clay tile pipe joint seal compositions. Quite unexpectedly, the lower density joint seal constructions appear to be fully equivalent to the prior art unsaturated polyester resin joint seals in performance.

The resulting joint seals achieve cost savings since the resin content can be lowered to about one-half that of existing pipe joint seals.

The alpha-hydroxy azo blowing agents have the general formula

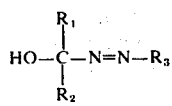

wherein $R_1$ and $R_2$ are lower alkyl groups having from one to four carbon atoms and $R_3$ is a tertiary alkyl group having four to eight carbon atoms or an aromatic-substituted tertiary alkyl group having nine to twelve carbon atoms. Examples of the $R_3$ substituent are the T-butyl radical and the alpha-cumyl radical.

A preferred alpha-hydroxy azo blowing agent is

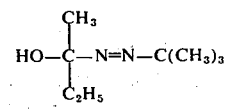

BRIEF DESCRIPTION OF THE DRAWING(S)

DESCRIPTION OF THE PREFERRED EMBODIMENT(S)

Figure 1:
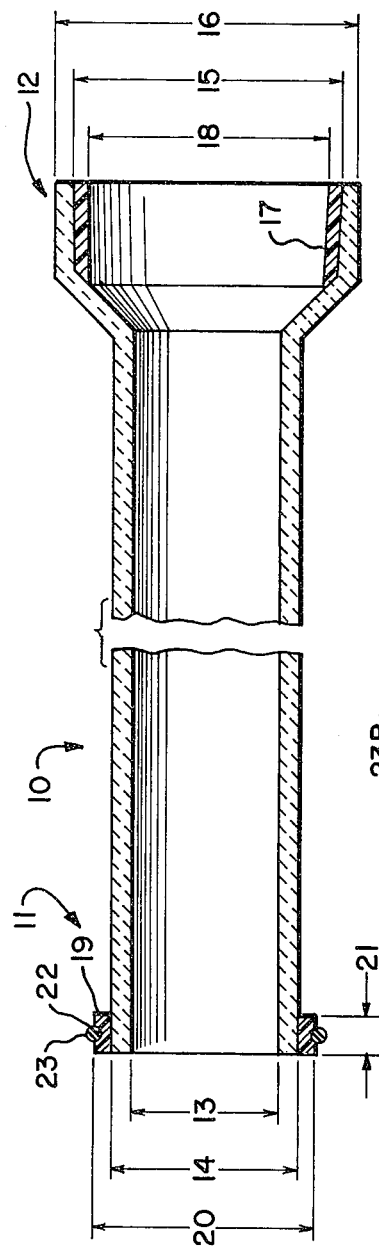
FIG. 1 is a cross-section illustration of a typical bell and spigot clay tile pipe showing the location of the factory installed joint seal.

Referring to FIG. 1 there is illustrated a typical bell and spigot clay tile pipe 10 having a spigot end 11 and a bell end 12. The clay tile pipe 10 is fabricated from fired clays. The spigot end 11 has an inner diameter 13 and an outer diameter 14. Customarily clay tile pipes have inner diameters ranging from a few inches up to a few feet. The thickness of the clay tile pipes ranges from less than one inch to several inches. The bell end 12 has an inner diameter 15 and an outer diameter 16. The inner diameter 15 is substantially larger than the outer diameter 14 of the spigot end. In accordance with prior art practices a factory applied casting 17 is applied to the inner wall of the bell end 12 to provide a sleeve having an inner diameter 18. The factory applied casting 17 is tightly adhered to the inner wall of the bell end 12 by means of a primer coating which is co-reactive with the clay tile pipe surface and the joint seal composition.

Typical co-reactive primers include as the active ingredient epoxy-silanes and acryloxy-silanes such as methacrylyl-oxy propyl trimetoxy silane.

The factory applied casting 17 is formed by inserting a true-cylinder form into the bell end 12 of the pipe 10. The cylinder form has an outer diameter 18. Curable resinous compositions are introduced into the annular space between the cylinder form and the primer-coated inner wall of the bell 12. After the resinous composition is cured, the cylinder form is withdrawn for reuse with other clay tile pipes.

The spigot end 11 of the clay tile pipe 10 is provided with a factory applied ring 19 having an outer diameter 20, a width 21 and usually a peripheral groove 22 adapted to receive an O-ring 23. The ring 19 alternatively may have an integral bead which serves the function of an O-ring. The ring 19 is fabricated from urethane elastomers or unsaturated polyester resins.

It will be observed that the outer diameter 20 of the ring 19 approximates the inner diameter 18 of the casting 17.

Figure 2:
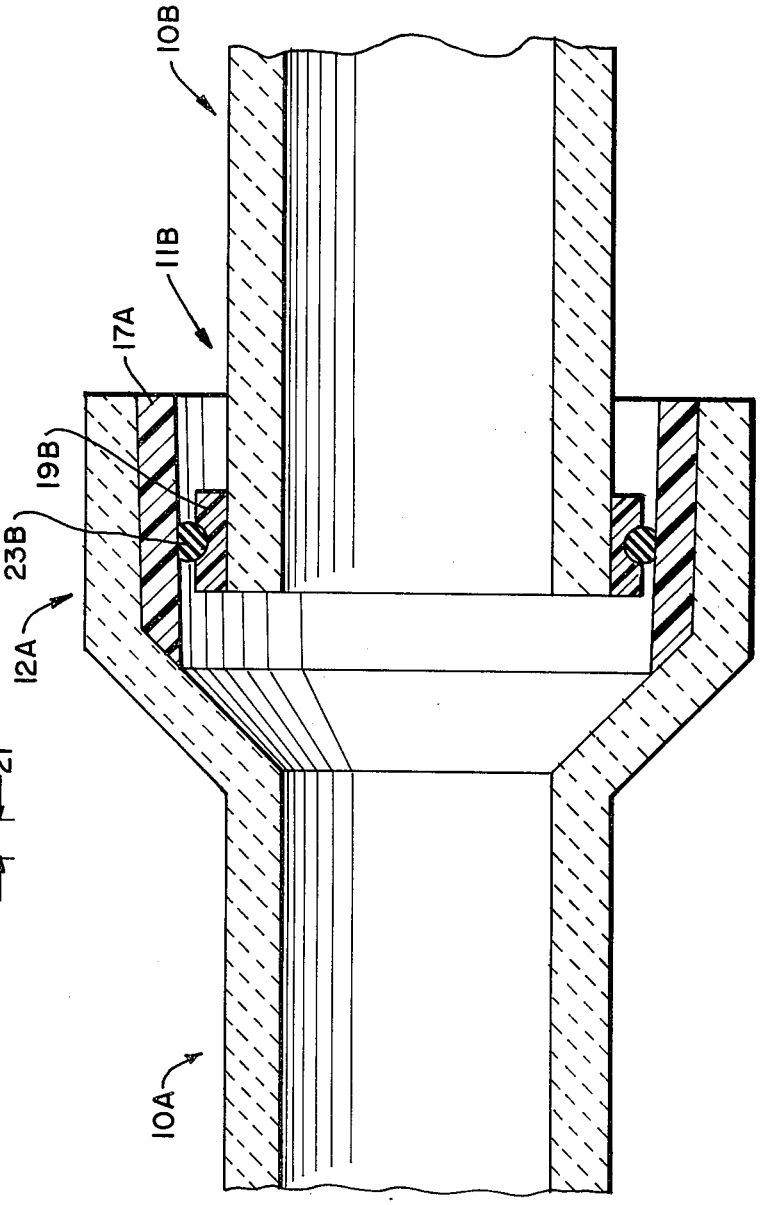
FIG. 2 is a cross-section illustration of an assembled bell and spigot joint utilizing a factory installed joint seal with an O-ring.

Two clay tile pipes are joined as shown in FIG. 2 wherein the left-hand pipe elements are identified by the letter A and the right-hand pipe elements are identified by the letter B. It will be observed in FIG. 2 that the bell end 12A may be provided with a slightly tapered inner wall to accommodate the entry of the spigot end 11B of an engaged clay tile pipe.

In accordance with the present invention the casting 17 is fabricated from low density foamed unsaturated polyester resin.

EXAMPLE 1

A mixture for producing a joint seal for a bell end of a clay tile pipe is formulated as follows:

| | |
|---|---|
| Unsaturated polyester resin (hereinafter described) | 288 parts by weight |
| Milled glass fibers 1/32 inch long | 22 parts by weight |
| Pecan Shell Flour, milled to pass through 200 mesh standard screen | 30 parts by weight |
| 1.0% by weight (based on the weight of the resin) - silicone surfactant | |
| 0.5% by weight (based on the weight of the resin) - tertiary butyl perbenzoate | |
| 0.04% by weight (based on the weight of the resin) - copper solution containing 1.2% copper to serve as an accelerator | |

To this mixture is added based on the total weight of the resin 1% of an alpha-hydroxy-azo blowing agent, specifically

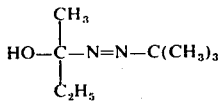

The material was employed with a 4 inch diameter vitrified clay tile pipe. The interior surface of the bell portion of the clay tile pipe was coated with an acrylic terminated silane primer specifically containing as the active ingredient methacryloxypropyl trimethoxy silane in a volatile solvent. 180 grams of the described mixture was poured into the bell of the clay tile pipe and allowed to foam. The foam rose well above the mold surface and necessitated considerable trimming to produce a visually attractive bell end coating. The foam reached full rise and gelled in about 5 minutes. The mold sleeve was removed in about 10 minutes. The foam made an excellent bell end joint seal when connected with the spigot end ring of a similar 4 inch vitrified clay tile pipe. The joint was subjected to temperatures of −25°F for 48 hours after which time the joint adhesion was evaluated as being fair.

The specific unsaturated polyester resin which was employed in EXAMPLE 1 is formulated by combining 105 mols propylene glycol with 50 mols isophthalic acid and 50 mols maleic anhydride. The resulting polyester resin is cooked to an acid number of 17 to 25. The resulting polyester is combined with monomeric styrene on the weight basis of 2 parts polyester to one part styrene. Hydroquinone and toluhydroquinone are utilized as polymerization inhibitors in the resin.

EXAMPLE 2

The unsaturated polyester resin described in EXAMPLE 1 was employed to produce another foamed unsaturated polyester resin clay tile pipe joint. 110 parts by weight of the unsaturated polyester resin of EXAMPLE 1 were combined with 14 parts by weight milled glass fibers 1/32 inch long and 16.8 parts by weight pecan shell flour milled to pass through a 200 mesh U.S. standard screen. To this mixture was added (based on the volume of the unsaturated polyester resin syrup) 0.04 volume percent copper naphthenate solution containing 1.2% by weight copper ion; 0.2% by volume tertiary butyl perbenzoate; and 1.0% by volume of a silicone surfactant.

A vitrified clay tile pipe section, 4 inches nominal diameter, was primed with a solvent solution of methacryloxypropyltrimethoxy silane and allowed to dry for 15 minutes. A cylinder joint seal forming mold was coated with a mold release agent, specifically silicone stopcock grease, to preclude adhesion of the resin to the cylinder form. The annular space between the cylinder form and the inner wall of the pipe bell receive 140 grams of the described mixture of unsaturated polyester resin to which 1.0% by volume (based on the resin volume) of the alpha-hydroxy-azo blowing agent of EXAMPLE 1 was added. The polyester resin was allowed to foam in the annular space to form the bell end joint seal. The resin gelled in about 4 minutes and was fully cured in about 10 minutes. The resin foamed to approximately the top of the bell indicating that 140 grams of the overall mixture is about the proper amount for charging the 4 inch diameter vitrified clay tile pipe bell.

The bell was connected to the spigot ring of another clay tile pipe section to form an excellent joint. The joint was exposed to −25°F for 48 hours after which the joint had an excellent appearance. The density of the sleeve was 35 pounds per cubic foot. The bell end casting material had a compression strength of 3350 pounds per square inch and a compression modulus of $4.9 \times 10^4$.

The bell end joint seal can be rendered more resilient by using a somewhat softer unsaturated polyester resin.

EXAMPLE 3

A clay tile pipe joint seal was prepared in which unsaturated polyester resin was a mixture of two resins, specifically equal parts of the resin of EXAMPLE 1 and a resin produced as follows and identified as resin B.

27.77 parts by weight diethylene glycol; 3.70 parts by weight dipropylene glycol; 38 parts by weight isophthalic acid and 4.61 parts by weight maleic anhydride are combined and cooked to a low acid number. 65 parts by weight of the resulting polyester resin is combined with 35 parts by weight monomeric styrene and inhibited with hydroquinone and toluhydroquinone.

The clay tile pipe joint seal formulation included 80 parts by weight of the mixture of resins A and B;
  10 parts by weight powdered calcium carbonate;
  10 parts by weight milled glass fibers 1/32 inch;
  1.0% by weight based on the resin of a silicone surfactant;
  0.5% by weight based on the weight of the resin tertiary butyl perbenzoate;
  0.04% by weight based on the weight of the resin of a copper naphthenate solution containing 1.2% by weight of copper ion.

This mixture was combined with 1.0% by weight based on the weight of resin of the alpha-hydroxy-azo blowing agent of EXAMPLE 1. The resulting mixture has a syrupy consistency and flows readily. The mixture was introduced into a 4 inch diameter clay tile pipe which had been primed in the manner described in EXAMPLES 1 and 2. The resulting joint seal had a density of 41 pounds per cubic foot, a compressive strength of 2450 psi and a compressive modulus of $2.80 \times 10^4$. Flexibility was demonstrated by compressing the joint seal to half its thickness without breaking.

The Unsaturated Polyester Resin

Unsaturated polyester resins normally are prepared by polyesterification of glycols and polybasic acids at least a portion of which includes ethylenically unsaturated polybasic acids or anhydrides. The glycols customarily include ethylene glycol, propylene glycol, diethylene glycol, dipropylene glycol, butylene glycol and other alkylene oxide glycols. Branched chain glycols such as neopentyl glycol also are employed. Aromatic glycols such as xylylene glycol have been used. The polybasic acids include as saturated acids, phthalic acid and anhydride, isophthalic acid, teraphthalic acid, aliphatic acids such as adipic acid, tetrahydrophthalic anhydride and acid, chlorinated and brominated acids, and the like. The unsaturated dibasic acid may included maleic acid or anhydride, furmaric acid, and other well known ethylenically unsaturated dicarboxylic acids.

The unsaturated polyester resin is customarily available as a resin syrup in which it is combined with a copolymerizable solvent such as styrene, vinyl toluene, divinyl benzene, maleic acid half esters, methacrylic acid, acrylic acid, alkyl esters of acrylic acid and of methacrylic acid and the like. In general the copolymerizable solvent contains ethylenic unsaturation.

Suitable fillers for the clay tile pipe joint seals include finely powdered essentially inert materials such as ground glass, silica, calcium carbonate, clays, wood flours and the like. Suitable fibrous materials may be incorporated such as milled glass fibers or organic fibers such as nylon fibers, cotton fibers, wool fibers and the like.

Any suitable polymerization initiator such as a free radical generating peroxy compound can be employed to cure the polymerizable mixture. Suitable metal salt accelerators such as cobalt salts, copper salts, manganeses salts, et cetera, can be employed. Copper salts, such as copper naphthenate, are preferred because of their observed synergism with the blowing agents.

The blowing agent has been identified as alpha-hydroxy azo blowing agent. While certain azo compounds have been employed in blowing sponge rubber products, the present alpha-hydroxy azo blowing agents can be distinguished, perhaps because they are acid-activated. The particularly preferred alpha-hydroxy azo blowing agent is

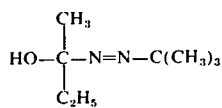

The amount of alpha-hydroxy-azo blowing agent in the foamable composition ranges from about 0.25% to about 5%. The resulting foam of the joint seals should have a density in the range of about 0.5 to about 1.0.

Comparison of the present foamed polyester joint seal with prior art unsaturated polyester resin joint seals shows that the amount of polyester resin required to produce the foamed joint seal is only about half the amount required to produce joint seals of the prior art.

A typical standard commercial pipe joint seal composition of the prior art contains 100 parts by weight of unsaturated polyester resin similar to that described in EXAMPLE 1 along with 140 parts by weight of powdered silica. The resulting pipe joint seal has a density of 117 pounds per cubic foot, a compression strength of 2800 psi and a compression modulus of $3.5 \times 10^3$.

We claim:

1. The method of making a joint sealing gasket for the bell end of a clay tile pipe which comprises:

applying to the inner surface of the said bell end a composition comprising: unsaturated polyester resin syrup, a metal salt activator and a peroxy initiator for the syrup, and inert fillers, and an alphahydroxy azo blowing agent, retaining the said composition in engagement with the said inner surface until it cures to a sleeve-like gasket having a density in the range of 25 to 65 pounds per cubic foot.

2. The method of claim 1 employing as a blowing agent an alpha-hydroxy azo compound having a formula

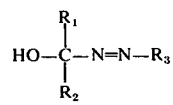

wherein $R_1$ and $R_2$ are lower alkyl groups having one to four carbon atoms and $R_3$ is a tertiary alkyl group having four to eight carbon atoms or an aromatic-substituted tertiary alkyl group having nine to twelve carbon atoms.

3. The method of claim 2 employing as the blowing agent

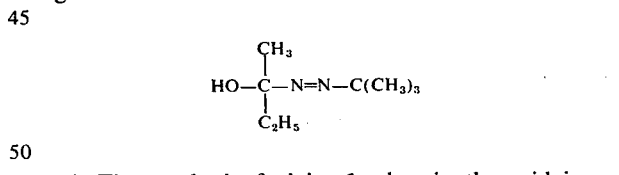

4. The method of claim 1 wherein the said inner surface of the bell end of the clay tile pipe is primed with a primer which is co-reactive with the clay tile surface and with the said composition.

5. The method of claim 4 wherein the said primer includes as its co-reactive ingredient acryloxy propyl methoxy silane.

6. The method of claim 1 wherein the said metal salt activator is a copper salt.

7. A clay tile pipe having a sealing gasket in its bell end produced by the method of claim 1.

* * * * *